MODIFIED TRUNK CIRCUIT

Filed Jan. 25, 1956 4 Sheets-Sheet 1

INVENTOR.
FERDINAND J. CAMPA
BY J. Warren Whitesel
ATTORNEY

Oct. 3, 1961 F. J. CAMPA 3,003,040

MODIFIED TRUNK CIRCUIT

Filed Jan. 25, 1956 4 Sheets-Sheet 2

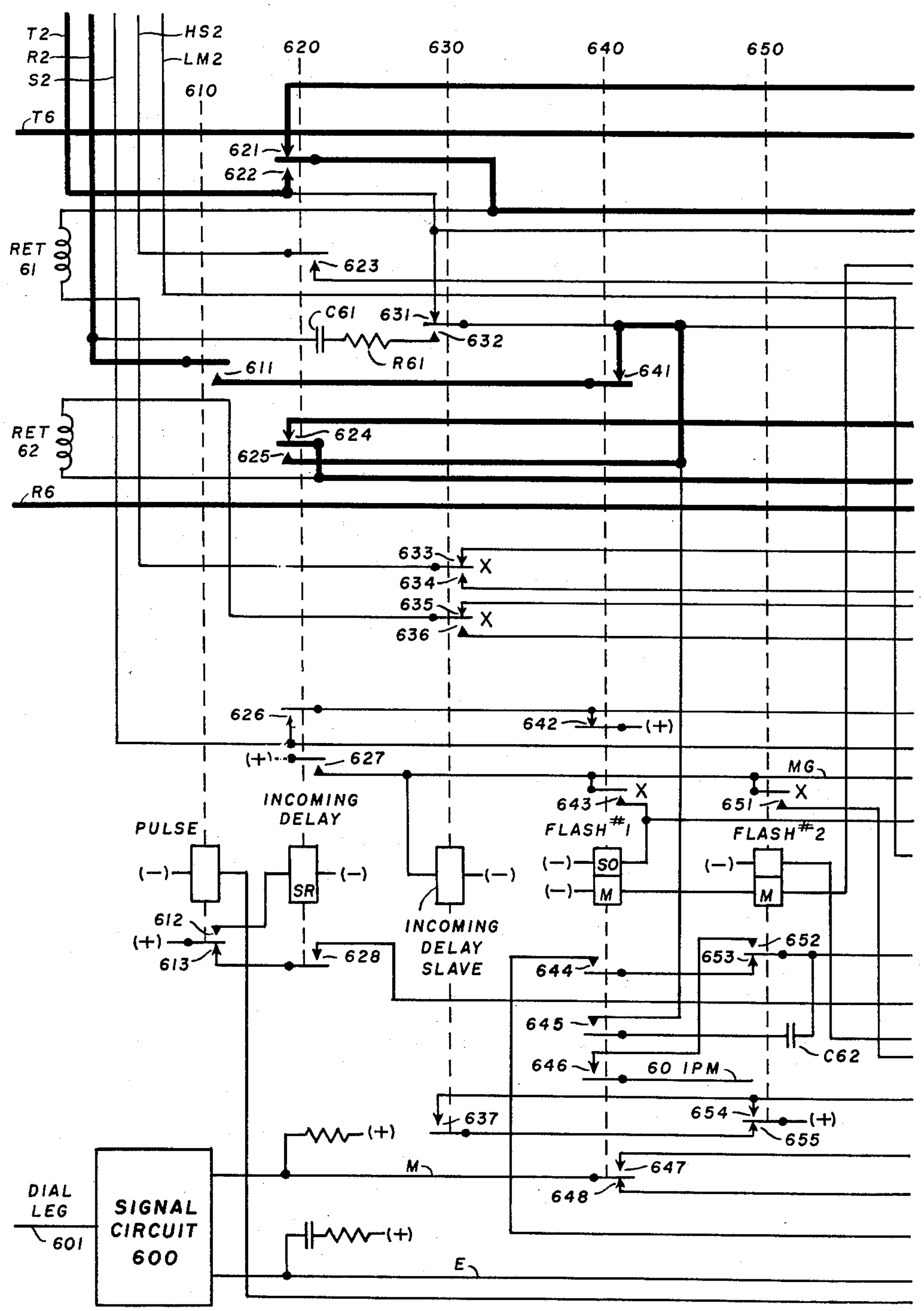
FIG. 6 TRUNK CIRCUIT 20

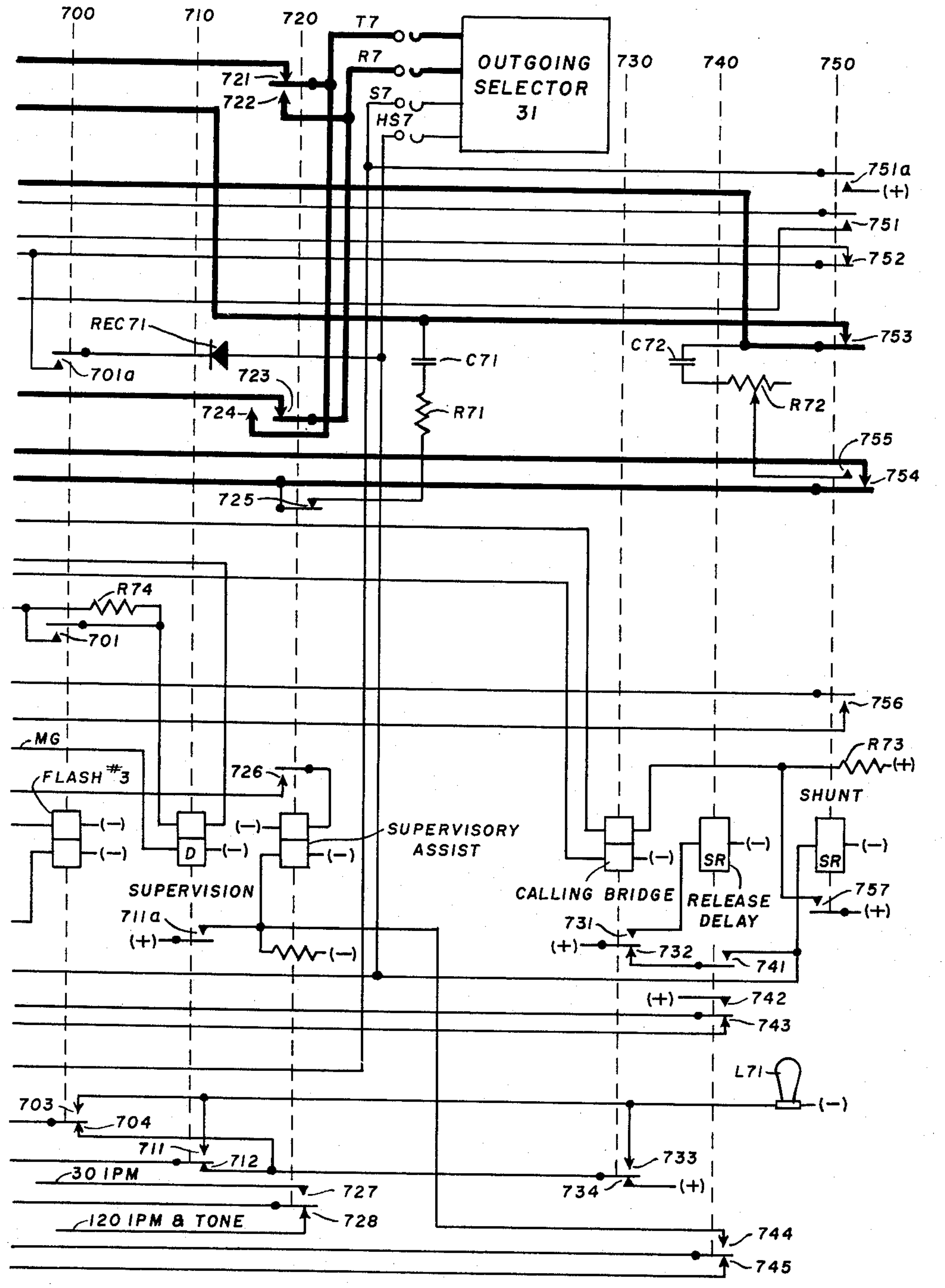
FIG. 7 TRUNK CIRCUIT 20

United States Patent Office 3,003,040
Patented Oct. 3, 1961

3,003,040

MODIFIED TRUNK CIRCUIT

Ferdinand J. Campa, Tampa, Fla., assignor to General Dynamics Corporation, Rochester, N.Y., a corporation of Delaware Filed Jan. 25, 1956, Ser. No. 561,268
5 Claims. (Cl. 179—18)

This invention relates to telephone systems, and more particularly to trunk circuits.

In the art of automatic telephony, certain calls are completed where it is necessary to relay signals from one office to another through an intermediate office. A call which is typical of this type is known in the art as a "tandem call." Various problems are introduced in signaling during a tandem call. One of the important problems encountered relates to the time element. Signals that are received from an originating office and are destined for a called office involve means for relaying them through a tandem office. Very often there is not time to prepare properly for repeating these signals. The result is that the tandem office may have received two or three pulses before it is prepared to repeat them; hence, distorted pulses may be repeated to the called exchange. Therefore, it is desirable to provide means for eliminating or greatly reducing any delays occasioned by the preparation of the trunk circuit to receive and repeat signals.

A first object of this invention is to provide a new and improved trunk circuit.

A further object of the invention is to reduce the time required for the trunk circuit to prepare itself to respond to and repeat signals from a distant office.

Still another object of this invention is to reduce pulse distortion introduced by a trunk circuit in a tandem exchange.

These and other objects are accomplished by means described herein in connection with a four-wire telephone system. An outgoing trunk circuit is prepared to repeat digit pulses by means of a preparatory signal sent over a fourth wire from an incoming trunk circuit in the same exchange. This preparatory signal is sent simultaneously with the first signal that is repeated in the incoming trunk circuit. The signal that is sent over the fourth wire is on a "direct circuit," so to speak. The repeated signal pulses that are sent on the talking conductors involve the operate time of several relays. Enough delay is provided in repeating and transmitting the signals to be sure that the preparatory signal sent over the fourth conductor will reach the outgoing trunk circuit first. In this manner, that circuit is prepared so that distortions are reduced.

It is thought that the invention may be understood best by making reference to the accompanying drawings, in which.

Figures 1, 5:
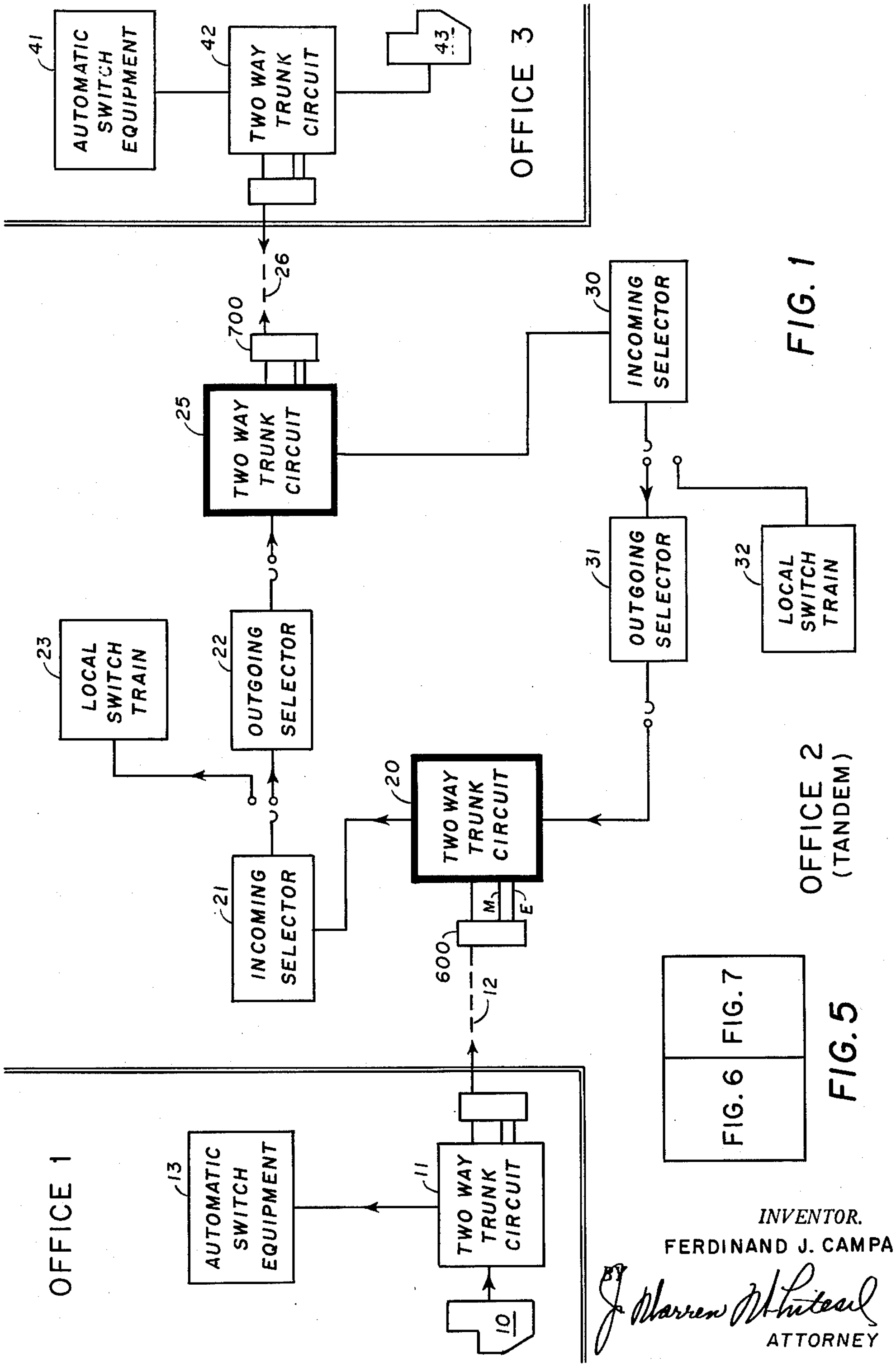
FIG. 1 shows a block diagram of a system utilizing the invention.

FIG. 5 shows the manner in which the remaining figures should be joined to provide a complete and understandable circuit; and FIGS. 6 and 7 when joined in the manner shown in FIG. 5 show details of trunk circuits 20 and 25.

Energy for the system shown and described herein is provided by means of a source of potential shown by means of plus (+) and minus (−) signs. As is the case in most telephone systems, the positive pole is described as being connected with ground, hence the terms "(−) battery" and "ground (+)." However, it should be understood that any other suitable system could be used also.

Referring next to the drawings, FIGS. 6 and 7 are substantially the same as FIGS. 6 and 7 of an earlier filed copending application Serial No. 535,832, filed September 22, 1955, of which I am one of the joint inventors and which is assigned to the same assignee as this invention. Reference may be made to that application for a complete disclosure of how the trunk circuits of FIGS. 6 and 7 work, together with a disclosure of selectors 21 and 22. The only differences between the aforementioned previously filed application and the present application are certain modifications which are shown in a summary fashion in FIG. 3. For this reason, in the following specification FIGS. 6 and 7 will not be described in detail.

Figures 2, 3, 4:
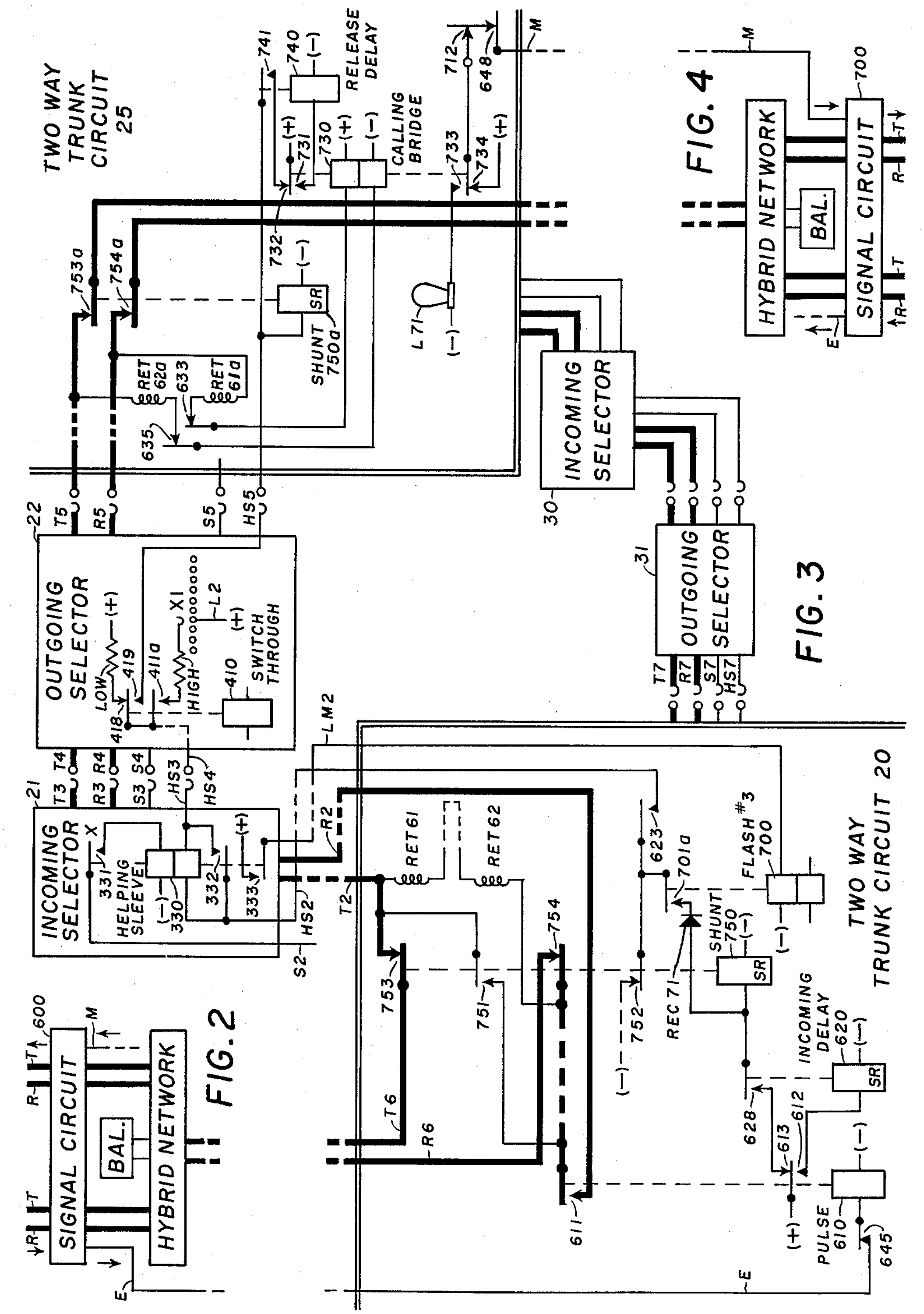
FIG. 2 shows the circuit which receives signals from the originating office and forwards them to equipment in the tandem office.
FIG. 3 shows in brief skeletonized form the equipment in the tandem office.
FIG. 4 shows the circuit by means of which the signals are sent to the called office.

Referring now to FIG. 3, two-way trunk circuits 20 and 25 are identical. Both of them include certain portions which have been taken from the detailed showing of the trunk circuit in FIGS. 6 and 7. The incoming portion of the trunk circuit is shown in the rectangle marked "20" which is at the lower left side of FIG. 3, while the outgoing portion of the trunk circuit is shown in the rectangle marked "25" which is at the upper right side of FIG. 3.

*Brief description*

It may be assumed that a call is extended from a subscriber in originating office 1 (FIG. 1). It is placed through operator switchboard 10 by means of any suitable equipment (not shown). The operator at position 10 seizes two-way trunk circuit 11 and trunk line 12 which has access to two-way trunk circuit 20. From there the call is extended through incoming selector 21 under the control of single frequency signal circuit 600 which is adapted to receive and repeat digit pulses. If the operator dials a directory number which indicates that the call is for a subscriber who is local to tandem office 2, local switch train 23 may be used to complete the call in any suitable manner. On the other hand, if the operator at position 10 dials a directory number which indicates that this is a tandem call, incoming selector 21 seizes outgoing selector 22 and two-way trunk circuit 25. This trunk circuit is utilized to extend the call over trunk line 26 to two-way trunk circuit 42 and automatic switching equipment 41 or operator 43, as the case may be. From this point the call may be completed in any well known manner. If a call is originated in office 3 and extended to office 1, the same procedure is followed except that this time the operator at switchboard 43 causes automatic switch equipment 13 to seize a subscriber station in office 1.

FIGS. 2–4 may be arranged in a manner which is obvious from their placement on the sheet of the drawing on which they are found. These figures have been broken apart since the inventive features are found in FIG. 3. FIGS. 2 and 4 have been provided for reference only to illustrate the manner in which signals may be sent.

It is assumed that a call is extended from left to right via the equipment which is represented by FIGS. 2–4; therefore, the incoming portion of the trunk circuit is shown at the lower lefthand side of FIG. 3 while the outgoing portion of the trunk circuit is shown near the upper righthand side of FIG. 3. In this case, the switch train includes selectors 21 and 22.

If the call were to be extended in the reverse direction, equipment not shown in the two trunk circuits would be used. For example, that equipment which is shown in the lower lefthand side of FIG. 3 would be in trunk circuit 25, and vice versa. In this case, selectors 30 and 31 would be used.

FIGS. 2 and 4 show single frequency signal circuits.

One characteristic of this type of signal circuit is that if noise occurs on the line in the frequency range used to transmit signals between the office, dial leg 601 (see FIG. 6) is disconnected so that further signals will not be transmitted or received. Some signals may be distorted in transmission to the extent that they appear to be noise. Hence, it is desirable to prepare the circuits adequately to avoid this; otherwise the dial leg may be disconnected.

*Detailed description*

Let it be assumed that the operator at position 10 desires to place a call to office 3 by way of equipment shown in the tandem office (FIG. 3). She transmits signals which are in the form of a single frequency current. These signals are received by single frequency signal circuit 600 which converts them into suitable ground pulses which are applied to conductor E. The first ground pulse appearing on conductor E operates pulse relay 610 over contacts 645. Contacts 612 close to operate incoming delay relay 620 over an obvious circuit. Responsive thereto, contacts 628 close to prepare for the transmission of digit pulses. Trunk circuit 20 is thus seized and nothing further happens until digit pulses are received.

After two-way trunk circuit 20 has been seized the operator may dial to transmit additional digit pulses which are repeated through trunk circuit 20. Again, single frequency signal circuit 600 responds to apply ground pulses to conductor E. Each open or break in the ground on conductor E causes pulse relay 610 to restore. Responsive thereto, contacts 612 open; however, incoming delay relay 620 does not release throughout digit pulsing due to its slow release characteristics.

Contacts 613 close on receipt of the first digit pulse to energize and operate shunt relay 750 over a circuit which also includes contacts 628. Each time that a digit pulse terminates, contacts 613 open and relay 750 is deenergized; however, it continues to be held throughout the digit pulse train due to its slow release characteristics. When relay 750 operates, it opens contacts 753 and 754 thereby disconnecting retard coil windings RET61 and RET62 from their connection with conductors T6 and R6. Contacts 751 close to shunt tip and ring conductors T2 and R2 and to remove the inductive effects of retard coil windings RET61 and RET62. This improves pulsing characteristics.

The digit pulses are repeated at contacts 611 over a loop including conductor T2, operated contacts 751, pulsing contacts 611 and conductor R2. These pulses are effective for causing incoming selector 21 and then outgoing selector 22 to be set to seize two-way circuit 25 for connecting the call with office 3. At this point outgoing selector 22 has been driven to the level to which two-way trunk circuit 25 is connected. This level is marked by ground (+) on conductor L2 in bank X1 of selector 22. Ground (+) is returned over wiring L2, bank and brush X1, a high resistance, contacts 411*a*, conductor HS4, brush and conductor HS3, the lower winding of helping sleeve relay 330, conductor HS2, operated contacts 623, normal contacts 752 and (−) battery. Helping sleeve relay 330 operates and closes its "X" or preliminary contacts 331 thereby locking to sleeve conductor S2. Contacts 332 then close to shunt the lower winding of helping sleeve relay 330. Contacts 333 close to apply a ground (+) marking to conductor LM2. This operates flash #3 relay 700 over an obvious circuit.

When outgoing selector 22 switches through, a circuit is completed for operating calling bridge relay 730. This circuit may be traced from ground (+) through the upper winding of relay 730, rest contact 633, winding RET61*a*, brush and conductor R5, selectors 22 and 21, conductor R2, contact 611, retard coil windings RET62 and RET61, conductor T2, selectors 21 and 22, brush and conductor T5, winding RET62*a*, rest contact 635 and the lower winding of calling bridge relay 730 to (−) battery. Contacts 733 close to transmit a seizure signal from (−) battery through the filament of lamp L71, and over conductor M to the distant office via the signal circuit of FIG. 4. Contacts 731 close to operate release delay relay 740 over an obvious circuit.

*Preparatory pulse.*—The circuits are now in readiness for the receipt of the next digit pulse train which is transmitted by the operator at position 10. These pulses will be repeated through tandem office 2 to office 3. When these digit pulses are received at circuit 600 the ground marking extended over conductor E is removed a suitable number of times to repeat each pulse. Pulse relay 610 restores responsive to each interruption. This opens contacts 612; however, once more incoming delay relay 620 does not release due to its slow release characteristics. Contacts 613 close to operate shunt relay 750 over a circuit including contacts 628. Rectifier REC71, one side of which is connected between contacts 628 and winding 750, is poled so that it will conduct a preparatory pulse when a ground (+) marking is extended from contacts 613, through contacts 628, rectifier REC71, operated contacts 701*a*, 623, conductor HS2, contacts 332, conductors HS3 and HS4, operated contacts 419, conductor HS5, and the winding of shunt relay 750*a*. This, of course, is a duplicate of relay 750 which is shown in trunk circuit 20. Relay 750*a* operates responsive to the preparatory pulse to open contacts 753*a* and 754*a* thereby disconnecting windings RET61*a* and RET62*a* from their normal connection with the hybrid circuit of FIG. 4. Also, the talking conductors are disconnected from the signal circuit 700 so that they will not "see" the dial pulses as line noise and disconnect the dial leg. This prepares trunk circuit 25 to repeat the digit pulses.

*Digit pulses.*—Meanwhile, pulse relay 610 has opened contacts 611 to repeat the first digit pulse to trunk circuit 25. This digit pulse is extended over conductors T2 and R2, T3 and R3, T4 and R4, T5 and R5 to cause calling bridge relay 730 to pulse. When this relay restores responsive to the first digit pulse, it closes contacts 732 thereby completing another circuit for operating shunt relay 750*a*. Contacts 733 open and 734 close to repeat the digit pulse over conductor M to single frequency signal circuit 700 of FIG. 4. After the last pulse in the pulse train has been repeated, contacts 613 and 732 stand open for a period which exceeds the slow release time interval of relay 750*a* so that it releases.

It should be noted that relay 750*a* was energized over the various HS conductors before relay 730 fell to repeat the first digit pulse. This was because relay 750*a* was energized over a "clear circuit," so to speak, while the pulses repeated to relay 730 were extended over a "slow circuit," so to speak, because it involved the operating time of various relays.

The drawings and specification have shown and described only one embodiment of the invention; however, I intend to cover in the appended claims not only this embodiment but also all modifications thereof which may fall within the true spirit of my invention.

What is claimed is:

1. A telephone system comprising a tandem office, a first trunk circuit for receiving signals sent through said tandem office, a second trunk circuit for transmitting said signals sent through said tandem office, an automatic switch train comprising two talking conductors and two control conductors for interconnecting said trunk circuits, means for extending said signals over said talking conductors, said trunk circuits and said switching equipment comprising means which inherently delays said signals that are transmitted through said tandem office, and means in said first trunk circuit effective in response to receipt of said signals for preparing said second trunk circuit over one of said control conductors for transmission of said signal pulses, and circuit means whereby said last named means is made effective during said time delay.

2. The telephone system of claim 1 and including means effective simultaneously with the receipt of said signals at said first trunk for transmitting a control signal over one of said control conductors, and means responsive to said control signal for preparing said second trunk circuit to repeat said signals to said distant office.

3. A telephone system comprising a tandem office, means including a first trunk circuit and a second trunk circuit interconnected by an automatic switch train for transmitting signals through said tandem office, said last named means comprising a pair of talking conductors and at least one control conductor, means in said first trunk circuit for receiving and repeating signals from a first distant exchange, means for transmitting said repeated signals over said pair of talking conductors, means in said second trunk circuit for receiving said repeated signals and repeating said repeated signals to another distant exchange there being a time delay between receipt of said signals by said first trunk circuit and re-repeating said signals by said second trunk circuit, means in said first trunk circuit effective simultaneously with said repeating of said signal for transmitting a preparatory signal over said control conductor to said second trunk circuit, means in said second trunk circuit for utilizing said signal sent over said control conductor for preparing said second trunk circuit for said re-repeating of said signals whereby said second trunk circuit is prepared to re-repeat said signals during said time interval.

4. A telephone system comprising an originating office, a tandem office and a called office interconnected by trunk lines, a signal circuit terminating each of said trunk lines in said tandem office, a first and a second trunk circuit in said tandem office, an automatic switch train for interconnecting said first and second trunk circuits, means comprising a pair of talking conductors and at least one control conductor for extending calls between said originating and said called offices through said tandem office, means in each signal circuit for receiving signals transmitted through said tandem office from one of said other offices, means in said signal circuit for operating a first relay in said first trunk circuit to receive and repeat signals, means comprising contacts controlled by said first relay for repeating said signals over said talking conductors, a second relay in said second trunk circuit connected to said talking conductors to receive said repeated signals, a third relay connected to said control conductor, means responsive to operation of said first relay simultaneously effective with transmission of said repeated signal pulses for operating said third relay over said control conductor, and means responsive to operation of said third relay for preparing said second trunk circuit to re-repeat said signals to one of said distant offices.

5. The telephone system of claim 4 wherein said third relay is a slow release relay, and circuit means connecting said slow release relay to be energized by said second relay each time that it re-repeats said signals.

References Cited in the file of this patent

UNITED STATES PATENTS

| | | |
|---|---|---|
| 2,224,701 | Saville et al. | Dec. 10, 1940 |
| 2,235,343 | Vosper | Mar. 18, 1941 |
| 2,307,818 | Beale | Jan. 12, 1943 |
| 2,465,359 | Deakin | Mar. 29, 1949 |
| 2,475,546 | Gillings et al. | July 5, 1949 |
| 2,500,289 | Kessler | Mar. 14, 1950 |
| 2,614,173 | Bakker | Oct. 14, 1952 |
| 2,725,426 | Pharis | Nov. 29, 1955 |
| 2,744,160 | Bergholtz et al. | May 1, 1956 |
| 2,769,862 | Confeld | Nov. 6, 1956 |
| 2,802,901 | Gatzert | Aug. 13, 1957 |
| 2,843,672 | Gatzert | July 15, 1958 |